United States Patent
Pandey et al.

(10) Patent No.: US 11,797,014 B2
(45) Date of Patent: Oct. 24, 2023

(54) AUTONOMOUS VEHICLE AND INFRASTRUCTURE AIDED ROBOTIC SYSTEM FOR END-TO-END PACKAGE DELIVERY

(71) Applicant: Ford Global Technologies, LLC, Dearborn, MI (US)

(72) Inventors: Gaurav Pandey, College Station, TX (US); James McBride, Saline, MI (US); Justin Miller, Berkley, MI (US); Jianbo Lu, Northville, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 17/171,072

(22) Filed: Feb. 9, 2021

(65) Prior Publication Data

US 2022/0253059 A1    Aug. 11, 2022

(51) Int. Cl.
  *G05D 1/02* (2020.01)
  *G01C 21/00* (2006.01)
  *G01S 17/931* (2020.01)

(52) U.S. Cl.
  CPC ....... *G05D 1/0214* (2013.01); *G01C 21/3859* (2020.08); *G01S 17/931* (2020.01); *G05D 1/0274* (2013.01)

(58) Field of Classification Search
  CPC .............. G05D 1/0214; G05D 1/0274; G01C 21/3859; G01C 21/3407; G01C 21/3841;
  (Continued)

(56) References Cited

U.S. PATENT DOCUMENTS 10,245,993 B1 *  4/2019  Brady ................... B60P 7/13
11,513,519 B1 * 11/2022  Akella .................. G08G 1/00
(Continued)

FOREIGN PATENT DOCUMENTS

KR      20190121275 A    11/2019

OTHER PUBLICATIONS

Steve Crowe, "Ford package delivery tests combine autonomous vehicles, bipedal robots", The Robot Report, May 21, 2019, 15 pages.

(Continued)

*Primary Examiner* — Aaron L Troost
*Assistant Examiner* — Connor L Knight
(74) *Attorney, Agent, or Firm* — Brandon Hicks; Eversheds Sutherland (US) LLP

(57) ABSTRACT

A method for controlling a robotic vehicle in a delivery environment includes causing the robotic vehicle to deploy from an autonomous vehicle (AV) at a first AV position in the delivery environment. The method further includes localizing, via a robotic vehicle controller, an initial position within a global reference map using a robot vehicle perception system, receiving, from the AV, a 3-dimensional (3D) augmented map and localizing an updated position in the delivery environment based on the 3D augmented map and the global reference map. The robot vehicle perception system senses obstacle characteristics, and generates a unified 3D augmented map with robot-sensed obstacle characteristics. The method further includes generating a dynamic path plan to a package delivery destination using the unified 3D augmented map, and actuating the robot vehicle to the package delivery destination according to the dynamic path plan.

15 Claims, 5 Drawing Sheets

(58) Field of Classification Search
CPC .............. G01S 17/931; G01S 13/867; G01S 2013/9316; G01S 13/881; G01S 13/931; G01S 13/865; G01S 2013/9323; G01S 17/88; B62D 63/02; B62D 63/04; B65G 35/00; H04W 4/40
See application file for complete search history.

(56) References Cited

U.S. PATENT DOCUMENTS

| | | |
|---|---|---|
| 2017/0316701 A1 | 11/2017 | Gil et al. |
| 2018/0196445 A1* | 7/2018 | Bokeno .................. B60L 53/53 |
| 2018/0333853 A1* | 11/2018 | Cousins ............... G05D 1/0276 |
| 2019/0143872 A1 | 5/2019 | Gil |
| 2020/0026281 A1* | 1/2020 | Xiao ................. G06Q 10/0832 |
| 2020/0175468 A1* | 6/2020 | Tsuruta ................. B64C 39/024 |
| 2020/0225673 A1* | 7/2020 | Ebrahimi Afrouzi .. G06V 10/82 |
| 2020/0341467 A1* | 10/2020 | Glendenning ....... G05D 1/0088 |
| 2020/0363825 A1* | 11/2020 | Aoki ..................... G06V 20/17 |
| 2021/0063198 A1* | 3/2021 | Nister ..................... G06N 3/08 |
| 2022/0227279 A1* | 7/2022 | Thrush ................... B60P 1/003 |

OTHER PUBLICATIONS

George Lawton, "Autonomous delivery robots ready to roll and deliver", IoT Agenda, Oct. 15, 2018, 7 pages.
Dr. Khasha Ghaffarzadeh et al., "Mobile Robots, Autonomous Vehicles, and Drones in Logistics, Warehousing, and Delivery 2020-2040", IDTechEx Research, Nov. 2019, 20 pages.

* cited by examiner

AUTONOMOUS VEHICLE AND INFRASTRUCTURE AIDED ROBOTIC SYSTEM FOR END-TO-END PACKAGE DELIVERY

BACKGROUND

Robot navigation is a challenging problem in many environments as it involves the confluence of several different sub-problems, such as mapping, localization, path planning, and dynamic & static obstacle avoidance and control. Furthermore, a high-resolution map may not always be available, or an available map may be of low-resolution to the point that it is only partially usable. Autonomous vehicles (AVs) are capable of reaching the consumers parking lots but may not be equipped to take a package from the AV and deliver it to the doorsteps of the customers. The task of last 100 m delivery by the mobile robot becomes specifically challenging because of the varied environment that the robot has to deal with and the limited sensing and compute at hand.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
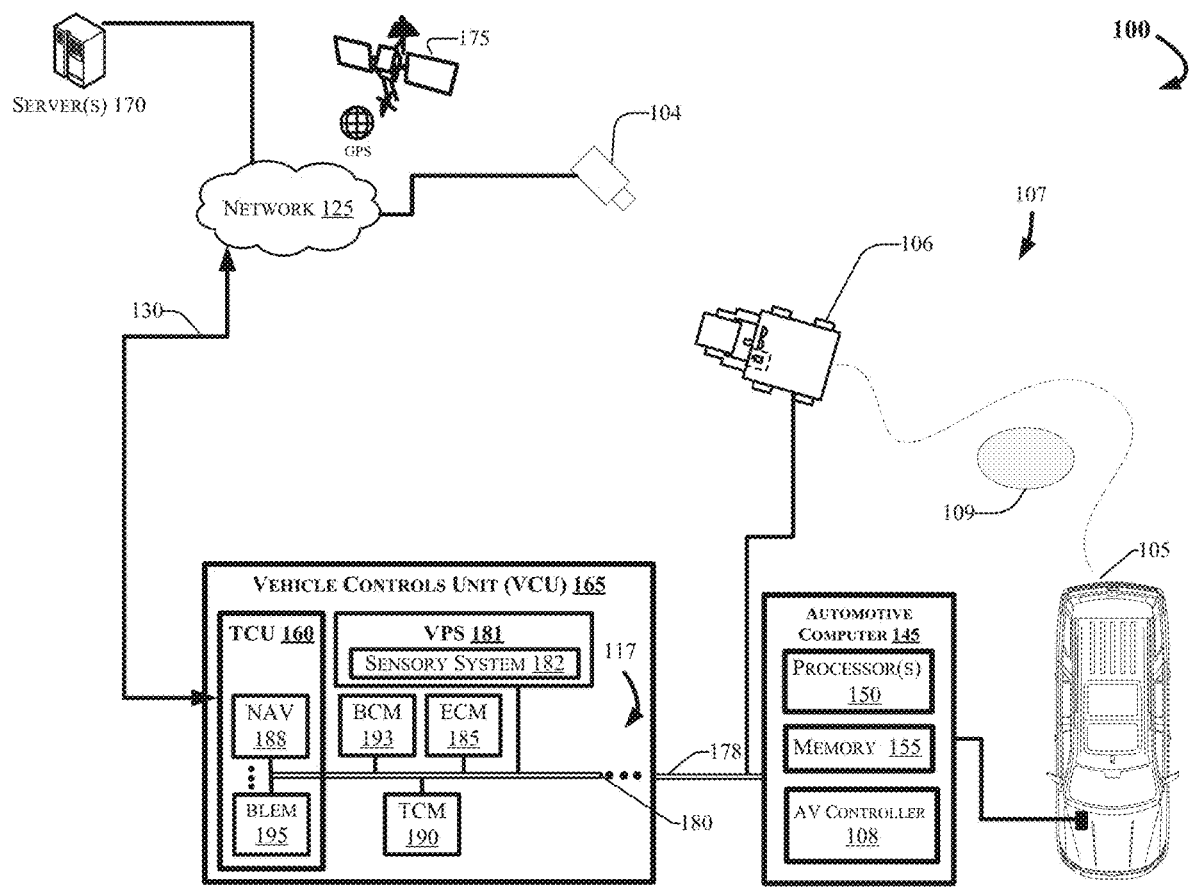
FIG. 1 depicts an example computing environment for an autonomous vehicle (AV) and a robotic deliver vehicle in accordance with the present disclosure.

Embodiments of the present disclosure describe systems include a last-mile delivery robot that can be integrated with an autonomous vehicle (AV) and infrastructure to perform the last-mile portion of a package delivery. Aspects of the present disclosure include extended sensing for the autonomous delivery robot. For example, when the AV arrives at the delivery location, the AV may sense key features of the delivery environment on behalf of the delivery robot, such as, for example, static features and obstacles such as doors, sidewalks, stairs, etc., and dynamically-changing obstacles such as animals, pedestrians, gates, etc. When the robot is unable to identify key features, the AV may move positions within the vicinity of its original parking location (e.g. along the street) to improve its vantage point of the key features. The AV may then unify some or all of the data collected from each vantage point into a single unified map format, and share the unified map with the delivery robot. As the robot operates, the AV may continue to monitor both the key features and the robot. The AV may again move to maintain a clear vantage point, and relay updated information to the robot.

Other aspects of the present disclosure may include infrastructure sensing. For example, an infrastructure-based sensor, such as a camera, lidar, Ultra-Wide Band (UWB) sensors, or other equipment may be installed within the area of a package delivery operation, such as a smart camera disposed to an exterior surface of a building in the delivery environment. As the delivery robot moves along the delivery route, it receives information about key features (obstacles and pathways) from the infrastructure sensors. The infrastructure sensor can also pan, tilt, and zoom into specific views to aid the robot as it moves along its path.

Another feature of the integration may include map fusion. For example, the AV may utilize a 3D map to navigate to the delivery location. When the AV arrives proximate to the delivery environment, the AV may pass information from one or more of global map tiles to create a local map for the robot that contains features or obstacles in the delivery environment. The AV may send the 3D map layers to the delivery robot, which may in turn utilize an onboard sensory system (e.g., 3D mapping hardware configured to scan and map the environment), along with a robotic controller configured with a matching algorithm to self-localize in a local reference frame of the map sent by the AV. As the robot operates, it may discover new features in the delivery environment using its onboard sensory system, and add the new features to the to create a unified 3D augmented map. The AV can also update its own global map tiles with the robot's additions.

Another feature of the integration may include data transfer of new types of information between the AV and robot delivery vehicle. For example, the AV can send a map to the delivery robot and the robot can localize to its location. The AV can also provide the robot with initiate positioning information since the robot was originally traveling inside the AV. The AV can also provide the robot with a navigational route, and may use its sensors to provide obstacle detection and classification for the robot.

Embodiments of the present disclosure may provide a robust system and methods for improved autonomous vehicle package delivery in urban and complex environments.

Illustrative Embodiments

The disclosure will be described more fully hereinafter with reference to the accompanying drawings, in which example embodiments of the disclosure are shown, and not intended to be limiting.

FIG. 1 depicts an example delivery and computing environment 100 that can include an autonomous vehicle 105, and a delivery robot 106.

Self-driving delivery platforms may curb the high cost of last-mile and last 100-meter delivery of goods. Disclosed embodiments describe robot navigation and package delivery in dynamically changing urban or other environments. The delivery robot 106 may be disposed in communication with the AV 105, and other devices connected via the network(s) 125. The delivery robot 106, described in greater detail with respect to FIGS. 2, 3, and 4, can include a combination of infrared (IR) cameras, LiDAR, and ultrasonic sensors configured and/or programmed to facilitate autonomous operation. The delivery robot 106 may utilize semantic segmentation on IR image streams to map semantics from a Red-Green-Blue (RGB) color image to a heat signature image obtained from IR sensor(s) onboard the AV 105. The delivery robot 106 may be configurable to include any robotic chassis, such as bipedal robot, a 4-legged robot, a wheeled robot (shown in FIG. 1), etc. The delivery robot 106 may further include robotic arms for loading, unloading, and performing other delivery tasks.

The autonomous vehicle 105 may include an automotive computer 145, and a Vehicle Controls Unit (VCU) 165 that can include a plurality of electronic control units (ECUs) 117 disposed in communication with the automotive computer 145. The autonomous vehicle 105 may connect with the automotive computer 145 using wired and/or wireless communication protocols and transceivers. The one or more network(s) 125 may communicate via one or more wireless connection(s) 130, and/or may connect with the autonomous vehicle 105 directly using near field communication (NFC) protocols, Bluetooth® protocols, Wi-Fi, Ultra-Wide Band (UWB), and other possible data connection and sharing techniques.

The autonomous vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the autonomous vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with one or more server(s) 170. The server(s) 170 may be part of a cloud-based computing infrastructure, and may be associated with and/or include a Telematics Service Delivery Network (SDN) that provides digital data services to the autonomous vehicle 105 and other vehicles (not shown in FIG. 1) that may be part of a vehicle fleet.

Although illustrated as a sport utility, the autonomous vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the autonomous vehicle 105 may be configured as an electric vehicle (EV). More particularly, the autonomous vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The autonomous vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the autonomous vehicle 105 may be programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

According to embodiments of the present disclosure, the robotic delivery system 107 may be configured and/or programmed to operate with a vehicle having a Level-4 or Level-5 autonomous vehicle controller. Accordingly, the robotic delivery system 107 may provide some aspects of human control to the autonomous vehicle 105, when the vehicle is configured as an AV.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The network(s) 125 may be disposed in communication with one or more infrastructure sensor devices 104 that may be installed in the delivery environment 100. The infrastructure-based sensor device(s) 104 may be located within the area of a package delivery operation (e.g. a smart camera affixed to a home). As the delivery robot 106 moves along the delivery route, it receives information about key features (obstacles 109 and pathways) from the infrastructure sensors. The infrastructure sensor(s) may also be configured to pan, tilt, and zoom into specific views to aid the robot 106 as it moves along its path. For example, the devices 104 may include a camera, a LIDAR device, a thermographic imaging device, a microphone, a RADAR device, or other types of sensors or sensor arrays that may detect static or dynamically changing environmental features and obstacles. In some aspects, the devices 104 may be rigidly mounted on a building or other surface, and/or include servo-driven actuators or other means for camera angle displacement such that the devices 104 may follow moving objects in the delivery environment 100.

The automotive computer 145 may be installed in an engine compartment of the autonomous vehicle 105 (or elsewhere in the autonomous vehicle 105) and operate as a functional part of the robotic delivery system 107, in accordance with the disclosure. The automotive computer 145 may include one or more processor(s) 150 and a computer-readable memory 155. The automotive computer 145 may further include and/or operate with an AV controller 108, which may provide autonomous driving features.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a robotic delivery program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between autonomous vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Body and Network Communication Controller (BANCC) 187, a Driver Assistances Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the autonomous vehicle 105, and implement one or more instruction sets stored in computer memory 155 of the automotive computer 145, including instructions operational as part of the robotic delivery system 107.

The TCU 160 can be configured and/or programmed to provide vehicle connectivity to wireless computing systems onboard and offboard the autonomous vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the autonomous vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with one or more keys.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the robotic delivery system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the robotic delivery system 107, and/or via wireless signal inputs received via the wireless connection(s) 133 from other connected devices. The ECUs 117, when configured as nodes in the bus 180, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

In some aspects, the autonomous vehicle 105 may include one or more Door Access Panels (DAPs) 191 disposed on exterior door surface(s) of vehicle door(s) 198, and connected with a DAP controller (not shown in FIG. 1). In some aspects, the user 140 may have the option of entering a vehicle by typing in a personal identification number (PIN) on an exterior interface associated with a vehicle. The user interface may be included as part of a Door Access Panel (DAP) 191, a wireless keypad, included as a part of a mobile device (not shown in FIG. 1), or included as part of another interface.

In other aspects, the Vehicle Perception System (VPS) 181 may include internal and external sensory systems (collectively referred to as sensory systems 182). The sensory systems 182 may be configured and/or programmed to obtain sensor data usable for biometric authentication, and for performing driver assistances operations such as, for example, active parking, trailer backup assistances, and object and obstacle detection.

The computing system architecture of the automotive computer 145, VCU 165, and/or the robotic delivery system 107 may omit certain computing modules. It should be readily understood that the computing environment depicted in FIG. 1 is an example of one possible implementation according to the present disclosure, and thus, it should not be considered limiting or exclusive.

Figure 2:
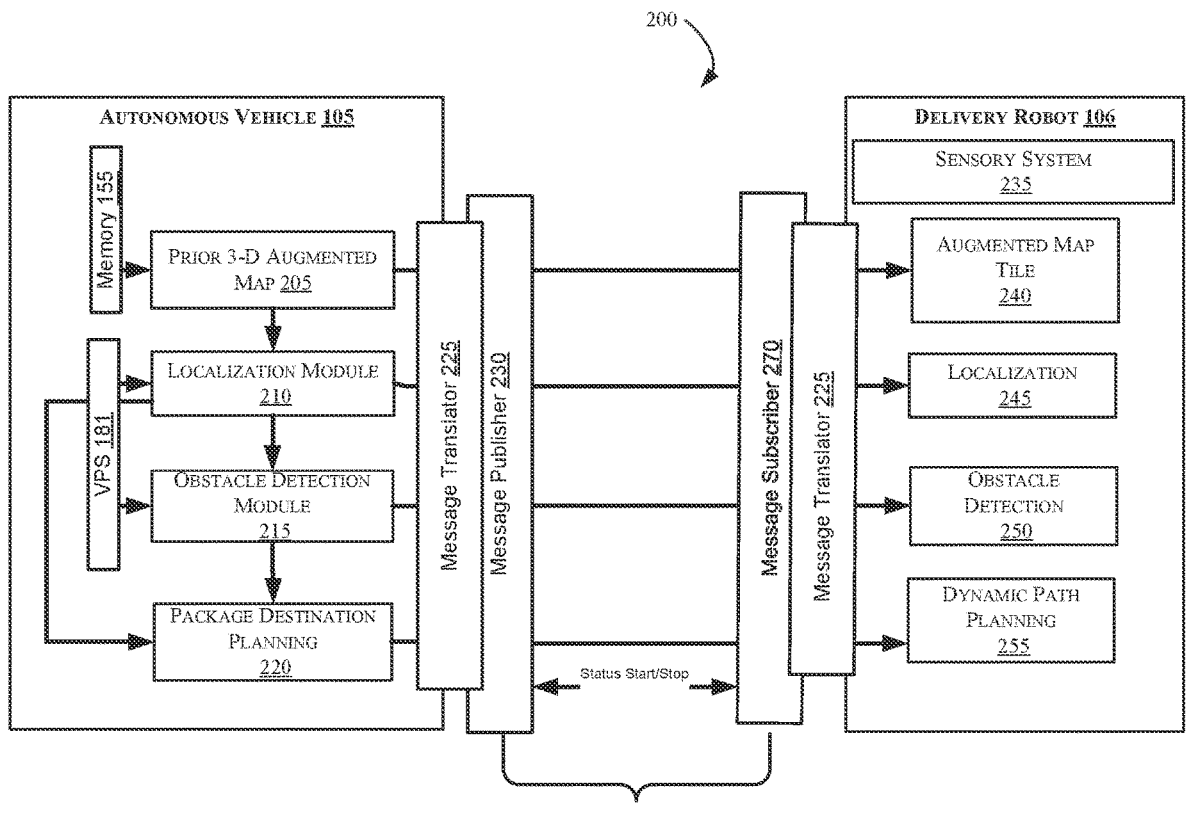
FIG. 2 depicts an example system architecture for interaction between the robotic delivery vehicle and AV of FIG. 1 in accordance with the present disclosure.

FIG. 2 depicts an example system architecture 200 for an AV-robot interaction, in accordance with the present disclosure. The infrastructure 200 illustrates the AV 105 being in communication with the delivery robot 106 via the network(s) 125. The AV 105 may transport the delivery robot 106 to a delivery environment (e.g., the delivery environment 100 as described with respect to FIG. 1) by transporting the delivery robot 106 in a cargo hold area (not shown in FIG. 2) of the AV 105, and deploying the delivery robot 106 to complete delivery of packages, equipment, or other items at a delivery destination such as a home, a business, or other destination. The AV is illustrated in FIG. 2 providing sensory output from the VPS 181 to a plurality of computing modules functional as part of the system 107 including, for example, a localization module 210, and an obstacle detection module 215. The memory 155 may store 3-D augmented maps 205 indicative of sensory information associated with a map of the delivery environment 100 (when available).

According to one or more embodiments, the AV 105 can smartly change its orientation/position in order to extend its view to the delivery robot 106 and aspects of the delivery environment 100 such as obstacles 109. Maintaining a clear view of the delivery and computing environment 100 may assist the robot 106 to sense the areas that would be otherwise impossible for the robot 106 to scan using its own sensory system 235. As the robot 106 performs package delivery operations, the AV 105 may continuously track the robot 106 and adjust its own position such that the AV 105 maintains maximum coverage of the surrounding delivery and computing environment 100 to the robot 106. The AV 105 may be considered, in this aspect, as a guard to the robot 106.

Prior to deployment of the delivery robot 106, and throughout the delivery process, the AV 105 may connect wirelessly with the delivery robot 106 and share messages using a message translator 225 operating on a message publisher 230. A message subscriber module may receive published messages from the AV 105, and communicate the messages using a ROS bridge or message translator 225. For example, a prior 3D augmented map module 205 may share an augmented or augmented 3D map with an augmented map tile 240. A localization module 210 operating on the AV 205 may share localization information using the localization module 245. Obstacle detection 250 may include obstacle information including characterization and classification of obstacles detected during an obstacle detection process 215 operating at the AV 105. A package destination planning module 220 may receive obstacle information, and location information from the localization module 210, and share the information with the delivery robot 106 for dynamic path planning 255. Status information 270 may be shared between the AV 105 and the delivery robot 106 across the network(s) 125.

The AV 105, after arriving at a delivery location and deploying the delivery robot 106, may identify key features for the robot (e.g., doors, navigational pathways, and obstacles, etc.). Responsive to determining that key environmental features cannot be identified, the AV 105 may change positions by moving from the point of robot deployment to another vicinity that provides an improved vantage point of the key features. For example, after deploying the robot 106 at a first position, the AV 105 may determine that the robot 106, after entering a fenced walkway or by another obstruction of view, may lose sight of the robot 106 while positioned at the original point of deployment. The AV 105 may reposition itself by slowly proceeding forward or backward until a clear vantage point is achieved that provides the AV 105 an unobstructed view of the robot 106. In another embodiment, the vehicle 105 may change position by parking in another location, and/or moving to a position different than the location at which the AV deployed the delivery robot 106.

An improved vantage point may be, for example, a clear line-of-sight from the AV 105 to the delivery robot 106 to a dynamic obstacle such as a pedestrian or animal, or a static obstacle such as a stationary object in the navigational pathway of the delivery robot 106, or other features such as stairs, building entrances, doorways, etc. The AV 105 may unify data collected from each vantage point into a single (unified) map format, and share the data by transmitting it to the delivery robot 106. As the robot 106 drives, the AV 105 may continue to monitor both the key features of the delivery environment 100 and the robot 106. The AV 105 may again move to maintain a clear vantage point and relay updated information to the robot 106.

As the delivery robot 106 robot deploys by exiting the AV 105 at a point of deployment (e.g. in a parking lot), the delivery robot 106 may not know its initial position as its sitting inside the AV 105, may not have access to GPS or any sensory devices associated with the sensory system 235. In one aspect, the AV 105 can assist the delivery robot 106 by providing an initial robot position in the 3D world as it deploys from the AV 105 cargo hold.

For example, in one embodiment, the AV may arrive at a delivery location, and compute its own position within a global reference frame (map). The AV 105 may determine a fixed drop off location for the robot 106 relative to the robot's 106 internal frame of reference (e.g. the system 107 may set a position disposed in a set and known location proximate a rear portion of the AV 105. The AV 105 may then compute a transformation between the robot's frame and the map frame, and relay that information to the robot 106 wirelessly through the network(s) 125. The robot 106 may utilize this pose estimate sent by the AV 105 as an initialization to its own localization algorithm, and begin scan matching to localize itself in its global map or local map. Scan mapping may include, for example, sensing objects and relative distances of the objects from a set and known position proximate the rear portion of the AV 105. The sensed objects, either stationary or dynamic, may be saved as part of the global map, and used as starting information for the robot 106 to update after deployment.

According to one or more embodiments, the AV 105 may plan the initial high-level path for the robot. The high-level path may be a general trajectory pathway on which the system 107 may plan to instruct the robot 106 to deliver a package during a delivery operation. The high level path may or may not be the path the robot 106 takes during delivery operations, which may change base on unexpected or unknown objects, people, and obstacles that are discovered by the AV 105 and/or the robot 106. Because AV may have the most updated information about the surrounding, the AV may provide the initial path plan to the delivery robot 106. For example, the earlier known path of the robot 106 may be blocked by a parked car on the street which the robot 106 will not be aware of, so the high-level plan may initially be made by the AV 105.

Responsive to the AV 105 arriving and deploying the robot 106, the AV 105 may plan a route for the robot 106. The AV 105 may use the robot's known initial pose and one or more identified key features (such as, for example, a doorway, or other feature) to mark the start and end positions of the robot's route. The AV 105 may the use a route planning algorithm (e.g. A*) to find a route within a map from start to end, and transmit the route as a 3D augmented map. The AV then transmit the map to the robot 106. The robot 106 may localize an updated position in the delivery environment based on the 3D augmented map and the global reference map. The robot 106 may follow the dynamic path plan to a package delivery destination, and follow the inverse of the dynamic path plan back to the AV.

The AV 105 may use the VPS 181 to sense objects and classify objects that may be obstacles, including dynamic obstacles that may be moving position with respect to time, and static obstacles that are not moving. It may be advantageous to sense any potential and active obstacles that may be unviewable by the robot's sensory system 235, but may be viewable using the AV's sensory system 181.

Figure 3:
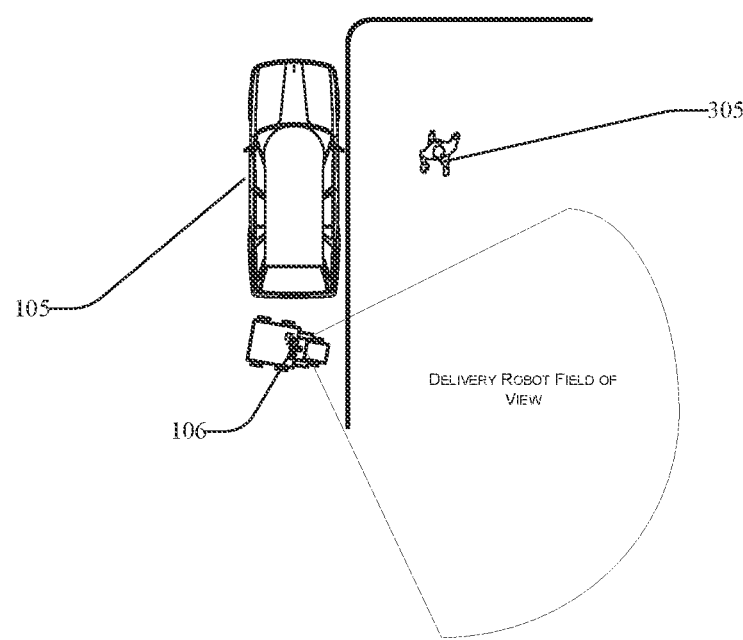
FIG. 3 illustrates an example delivery environment where a delivery robot has a limited field of view of a pedestrian.

FIG. 3 illustrates an example delivery environment where a delivery robot 106 has a limited field of view of a pedestrian 305 walking proximate to the delivery robot 106. The AV 105 has a full field of view that can observe an obstacle 305 walking in a potential pathway of the robot 106. However, the robot 106 may have an obstructed view of the obstacle 305. Accordingly, as robot 106 deploys from the AV 105, the robot 106 may not observe the pedestrian 305 approaching on the side walk because of blocked line of sight. As the robot 106 starts its mission, the AV 105 may continuously track the robot 106, and adjust its own position such that the AV 105 may maintain field of view of the scene and provide maximum coverage of the surrounding environment to the robot 106.

According to one embodiment, the AV 105 and the robot 106 may share a common map (either global or local map). The AV 105 may utilize the VPS 181 to identify obstacles (e.g., the pedestrian 305) and localize the obstacle(s) with respect to the common map. The robot 106 may update a 3D map using an internal obstacle avoidance algorithm (e.g., the obstacle detection 250 as shown in FIG. 2) with obstacles provided by the AV 105, and avoid those obstacles using a local planner (e.g., the dynamic path planning step 255 as shown in FIG. 2).

Figure 4:
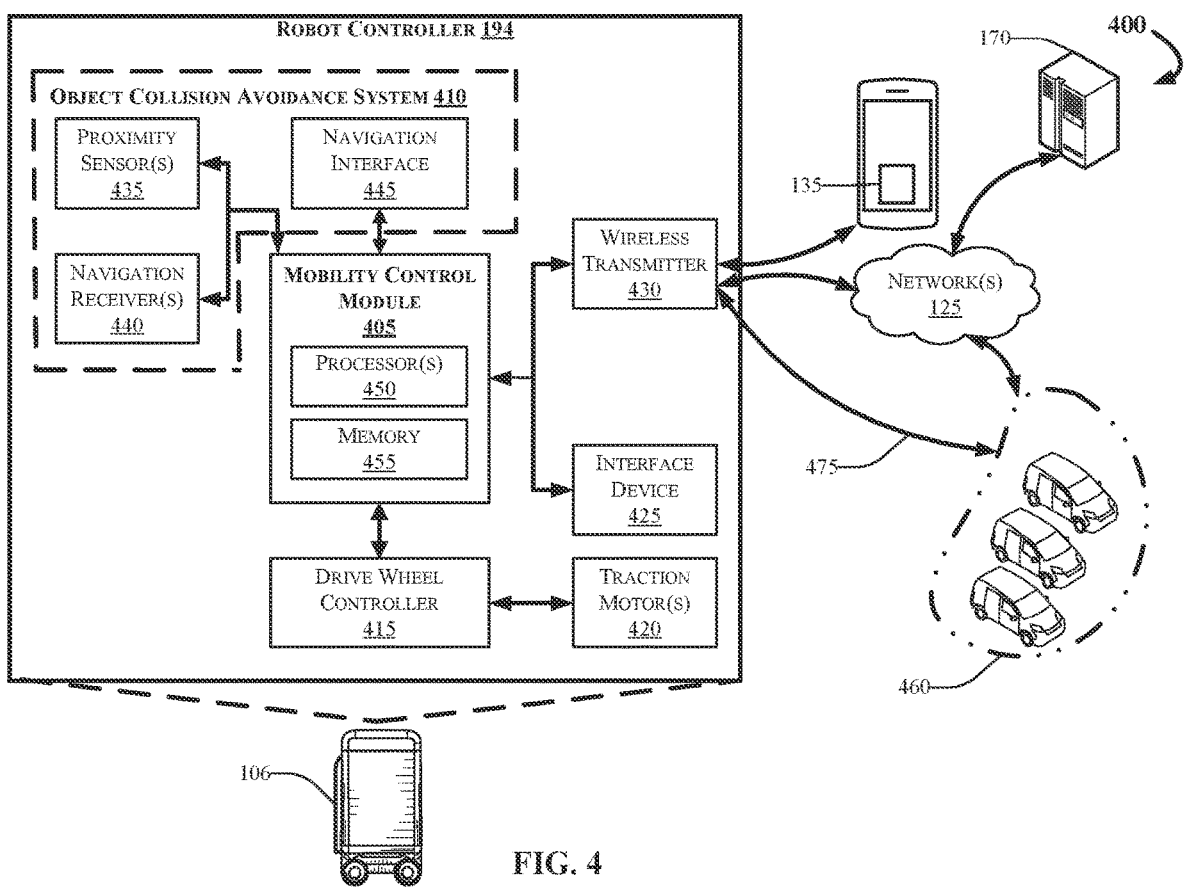
FIG. 4 depicts a block diagram of an example control system for an autonomous vehicle in accordance with the present disclosure.

FIG. 4 depicts a block diagram of an example autonomous vehicle controller 400 for control of the delivery robot 106, in accordance with embodiments. The AV controller 400 may cause the robotic vehicle 106 to deploy from the AV 105 at a first AV position in a delivery environment (e.g., the delivery environment 100 as shown in FIG. 1).

The mobility control module 405 may include one or more processor(s) 450, and a memory 455. The processor(s) 450 may be one or more commercially available general-purpose processor(s), such as a processor from the Intel® or ARM® architecture families. In some aspects, the mobility control module 405 may be implemented in a system on a chip (SoC) configuration, to include other system components such as RAM, flash storage and I/O buses. Alternatively, mobility control module 405 can be implemented using purpose-built integrated circuits, or any other suitable technology now known or later developed.

The memory 455 may include executable instructions implementing the basic functionality the AV controller 400 and a database of locations in geographic area. For example, the mobility control module 405 may connect with a drive wheel controller 415. The drive wheel controller 415 may communicate signals to one or more traction motor(s) 420, which may embody a drive mechanisms such as a brushless direct current (DC) motor, or another traction motor technology. The mobility control module 405 may cause the drive wheel controller 415 to transmit motive signals to the traction motor(s) 420 to the vehicle 05.

The AV controller 400 may further include an interface device 425 having input and output surfaces (not shown in FIG. 4) for providing interactive access to users onboard the AV (e.g., the autonomous vehicle 105). For example, the interface device 425 may include a touch screen interface surface configured and/or programmed to provide operational information such as power consumption information, battery health, battery level, etc. In some embodiments, the interface device 425 may further provide control features for controlling other motive aspects of the autonomous vehicle 105, such as breaking, acceleration, etc.

The AV 105 may be further configured and/or programmed to communicate information with other devices and vehicles using a wireless transmitter 430. The wireless transmitter 430 may communicate with one or more other autonomous vehicles in a vehicle fleet 460, and/or a central routing computer (e.g., the server(s) 170 as described with respect to FIG. 1) using a wireless communication network such as, for example, the network(s) 125. The network(s) 125 may be the Internet, a private network, a cellular telephone provider's data network, or other network infrastructure such as, for example, a vehicle-to-vehicle communication network. An example of a vehicle-to-vehicle communication protocol may be, for example, a dedicated short-range communication (DSRC) protocol.

The AV controller 400 may be disposed in communication with the network 125. The autonomous vehicle 105 and/or the delivery robot 106 may communicate with one or more other vehicles in a fleet of vehicles 465 in various ways, including via an indirect communication channel 470 using the network(s) 125, and/or via any number of direct communication channels 475.

In one example embodiment, the localization module 245 (as shown in FIG. 2) may localize an initial position within a global reference map using a robot vehicle perception system (e.g., the proximity sensor(s) 435). The interface device 425 may receive, from the AV 105, a first 3-dimensional (3D) augmented map, and save the map to memory 455 in the mobility control module 405.

In one embodiment, the robot controller 194 may localize an updated position in the delivery environment via the navigation receiver(s) 440, based on the 3D augmented map and the global reference map (not shown in FIG. 4), which may be saved in the memory 455. The robot controller 194 may sense, using a robot vehicle perception system (e.g., the proximity sensor(s) 435, obstacle characteristics, and generate a unified 3D augmented map with robot-sensed obstacle characteristics. The unified 3D augmented map may include updates received from the robot 106.

Accordingly, the robot controller 195 may generate a dynamic path plan to a package delivery destination using the unified 3D augmented map and actuate, via the processor 450, the delivery robot 106 to the package delivery destination according to the dynamic path plan.

The object collision avoidance system 410 may include one or more proximity sensor(s) 435, one or more navigation receiver(s) 488, and a navigation interface 445. The object collision avoidance system 410 may communicate control signals to a mobile device application (e.g., the application(s) 135 described with respect to FIG. 1).

The object collision avoidance system 410 may provide route management and communication between one or more other vehicles in the fleet, and to the operator of the vehicle. The mobility control module 405 may receive navigational data from the navigation receiver(s) 488 and the proximity sensor(s) 488, determine a navigational path from a first location to a second location, and provide instructions to the drive wheel controller 415 for autonomous, semi-autonomous, and/or manual operation.

The navigation receiver(s) 488 can include one or more of a global positioning system (GPS) receiver, and/or other related satellite navigation systems such as the global navigation satellite system (GLNSS), Galileo, or other similar systems known in the art of autonomous vehicle operation.

Additionally, the navigation receiver(s) 488 can be configured and/or programmed to receive locally based navigation cues to aid in precise navigation through space-restricted areas, such as, for example, in a crowded street, and/or in a distributed beacon environment. When deployed in conjunction with a distributed beacon network (not shown in FIG. 4), locally based navigation cues can include communication with one or more purpose-built location beacons (not shown in FIG. 4) placed throughout a geographic area.

The navigation cues may enable an increased Level-of navigation precision and provide specific indicators for locations of various points of interest. In other aspects, the navigation receiver(s) 488 may include one or more navigation transceivers (not shown in FIG. 4) for communication with mobile network infrastructure for cell tower triangulation and use of known-location Wi-Fi hotspots. Any location technology now known or later developed that can provide a high precision location (e.g. preferably within a linear foot) can be useful as part of navigation receiver(s) 488.

The proximity sensor(s) 435 may work in connection with the navigation receiver(s) 488 to provide situational awareness to mobility control module 405 for autonomous navigation. For example, the proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) 435 may alert the mobility control module 405 to the presence of sensed obstacles, where the trajectory information is indicative of moving objects or people that may interact with the autonomous vehicle 105. The trajectory information may include one or more of a relative distance, a trajectory, a speed, a size approximation, a weight approximation, and/or other information that may indicate physical characteristics of a physical object or person.

The mobility control module 405 may be configured and/or programmed to aggregate information from navigation receiver(s) 488, such as current position and speed, along with sensed obstacles from the proximity sensor(s) 435, and interpret the aggregated information to compute a safe path towards a destination such that the autonomous vehicle 105 avoids collisions. Sensed obstacles can include other vehicles, pedestrians, animals, structures, curbs, and other random objects. In some implementations the proximity sensor(s) 435 may be configured and/or programmed to determine the lateral dimensions of the path upon which the autonomous vehicle 105 is traveling, e.g. determining relative distance from the side of a sidewalk or curb, to help aid mobility control module 405 in maintaining precise navigation on a particular path.

Figure 5:
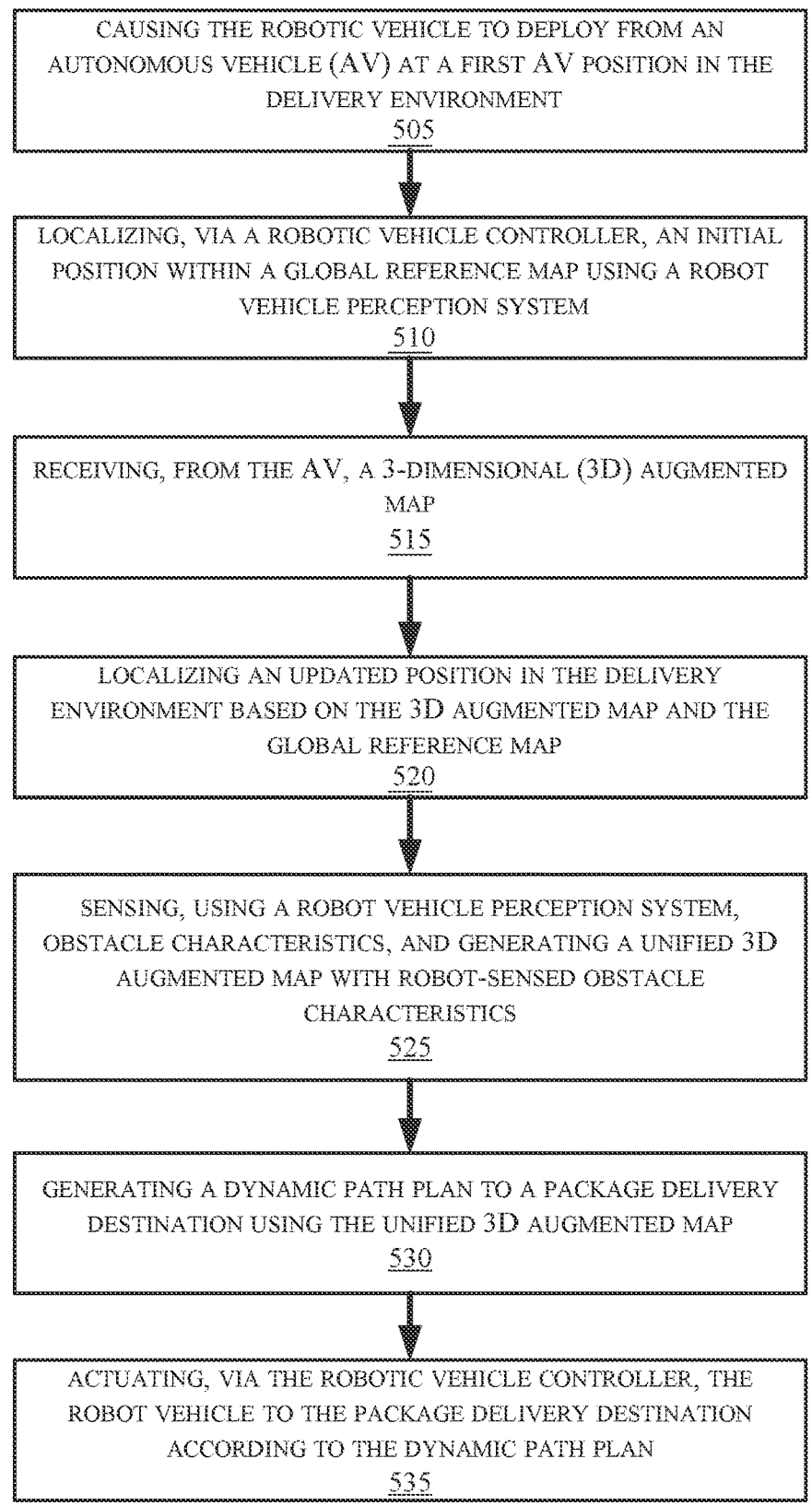
FIG. 5 is a flow diagram of an example method for controlling a robotic delivery system, according to the present disclosure.

FIG. 5 is a flow diagram of an example method 500 for controlling a robotic delivery system, according to the present disclosure. FIG. 5 may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, at step 505, the method 500 may commence with causing the robotic vehicle to deploy from an autonomous vehicle (AV) at a first AV position in the delivery environment.

At step 510, the method 500 may further include localizing, via a robotic vehicle controller, an initial position within a global reference map using a robot vehicle perception system.

At step 515, the method 500 may further include receiving, from the AV, a 3-dimensional (3D) augmented map.

At step 520, the method 500 may further include localizing an updated position in the delivery environment based on the 3D augmented map and the global reference map.

At step 525, the method 500 may further include sensing, using a robot vehicle perception system, obstacle characteristics, and generating a unified 3D augmented map with robot-sensed obstacle characteristics.

At step 530, the method 500 may further include actuating, via the robotic vehicle controller, the robot vehicle to the package delivery destination according to the dynamic path plan.

At step 535, the method 500 may further include generating a dynamic path plan to a package delivery destination using the unified 3D augmented map.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a robotic vehicle in a delivery environment, the robotic vehicle comprising a sensory system comprising a sensor, the method comprising:
    causing the robotic vehicle to deploy from an autonomous vehicle (AV) at a first AV position in the delivery environment,
    localizing, via a robotic vehicle controller, an initial position within a global reference map using a robot vehicle perception system;
    receiving, from the AV, a 3-dimensional (3D) augmented map;
    localizing an updated position in the delivery environment based on the 3D augmented map and the global reference map;
    detecting, via the robot vehicle perception system, an obstacle proximate to the robotic vehicle;
    generating robot-sensed obstacle characteristic information based on the obstacle that was detected;
    generating a first unified 3D augmented map by updating the 3D augmented map with the robot-sensed obstacle characteristics information;
    generating a dynamic path plan to a package delivery destination using the first unified 3D augmented map; and
    actuating, via the robotic vehicle controller, the robot vehicle to the package delivery destination according to the dynamic path plan;
    transmitting the first unified 3D augmented map to the AV;
    generating, via a vehicle perception system, AV-sensed obstacle characteristics;

generating a second unified 3D augmented map comprising the robot-sensed obstacle characteristics and AV-sensed obstacle characteristics;

receiving, via the robotic vehicle controller, the second unified 3D augmented map comprising the robot-sensed obstacle characteristics and the AV-sensed obstacle characteristics; and generating or updating the dynamic path plan to the package delivery destination using the second unified 3D augmented map.

2. The method according to claim 1, wherein the one or more of the robot-sensed obstacle characteristics and the AV-sensed obstacle characteristics comprises an obstacle localization and an obstacle class.

3. The method according to claim 2, wherein the obstacle class comprises one of a static obstacle and a dynamic obstacle.

4. The method according to claim 1, further comprising:
receiving, from the AV, a second AV position indicative of a second AV position in the delivery environment that is different from the first AV position;
generating an updated global reference map with the second AV position;
actuating, via the robotic vehicle controller, the robot vehicle to the package delivery destination according to the dynamic path plan and delivering a package at the package delivery destination; and
actuating the robot vehicle to travel to the second AV position based on the updated global reference map.

5. The method according to claim 4, wherein the sensor is a camera, wherein the sensory system further comprises a LiDAR system and an ultrasonic sensor, wherein the robot-sensed obstacle characteristics of the first and second unified 3D augmented maps are each generated with sensory data from each of the camera, the LiDAR system, and the ultrasonic sensor, and wherein the robotic vehicle is one of a bipedal robot, a 4-legged robot, and a wheeled robot.

6. The method according to claim 1, further comprising:
receiving, via the robotic vehicle controller, an infrastructure sensor data feed comprising infrastructure-sensed obstacle characteristics; and
generating the unified 3D augmented map based in part on the infrastructure-sensed obstacle characteristics.

7. The method according to claim 6, wherein the one or more of the robot-sensed obstacle characteristics and AV-sensed obstacle characteristics comprises an obstacle localization and an obstacle class.

8. The method according to claim 7, wherein the obstacle class comprises one of a static obstacle and a dynamic obstacle.

9. The method according to claim 1, wherein the sensor is a camera, wherein the sensory system further comprises a LiDAR system and an ultrasonic sensor, and wherein the robot-sensed obstacle characteristics of the first and second unified 3D augmented maps are each generated with sensory data from each of the camera, the LiDAR system, and the ultrasonic sensor.

10. A robot delivery system for a robot vehicle, the robotic vehicle comprising a sensory system comprising a sensor, the system comprising:
a processor; and
a memory for storing executable instructions, the processor programmed to execute the instructions to:
cause the robotic vehicle to deploy from an autonomous vehicle (AV) at a first AV position in the delivery environment, localize, via the processor, an initial position within a global reference map using a robot vehicle perception system;

receive, from the AV, a first 3-dimensional (3D) augmented map;

localize an updated position in the delivery environment based on the 3D augmented map and the global reference map;

detect, with a robot vehicle perception system, an obstacle proximate to the robotic vehicle;

generate robot-sensed obstacle characteristic information based on the obstacle that was detected;

generate a first unified 3D augmented map by updating the 3D augmented map with the robot-sensed obstacle characteristics;

generate a dynamic path plan to a package delivery destination using the first unified 3D augmented map; and actuate, via the processor, the robot vehicle to the package delivery destination according to the dynamic path plan;

transmit the first unified 3D augmented map to the AV;

generate, via a vehicle perception system, AV-sensed obstacle characteristics;

generate a second unified 3D augmented map comprising the robot-sensed obstacle characteristics and AV-sensed obstacle characteristics;

receive, via the processor, the second unified 3D augmented map comprising the robot-sensed obstacle characteristics and the AV-sensed obstacle characteristics; and generate or update the dynamic path plan to the package delivery destination using the second unified 3D augmented map.

11. The system according to claim 10, wherein the one or more of the robot-sensed obstacle characteristics and the AV-sensed obstacle characteristics comprises an obstacle localization and an obstacle class; and
wherein the obstacle class comprises one of a static obstacle and a dynamic obstacle.

12. The system according to claim 10, wherein the processor is further programmed to:
receive, from the AV, coordinates for a second AV position indicative of a second AV position in the delivery environment that is different from the first AV position;
generate an updated global reference map with the second AV position;
actuate the robot vehicle to the package delivery destination according to the dynamic path plan and delivering a package at the package delivery destination; and
actuate the robot vehicle to travel to the second AV position based on the updated global reference map.

13. The system according to claim 10, wherein the processor is further programmed to:
receive an infrastructure sensor data feed comprising infrastructure-sensed obstacle characteristics; and
generate the unified 3D augmented map based in part on the infrastructure-sensed obstacle characteristics.

14. The system according to claim 13, wherein the one or more of the robot-sensed obstacle characteristics and AV-sensed obstacle characteristics comprises an obstacle localization and an obstacle class; and
wherein the obstacle class comprises one of a static obstacle and a dynamic obstacle.

15. The system according to claim 10, wherein the sensor is a camera, wherein the sensory system further comprises a LiDAR system and an ultrasonic sensor, and wherein the robot-sensed obstacle characteristics of the first and second unified 3D augmented maps are each generated with sensory data from each of the camera, the LiDAR system, and the ultrasonic sensor.

\* \* \* \* \*